Patented Mar. 11, 1952

2,588,362

UNITED STATES PATENT OFFICE 2,588,362

FLAME RETARDANT POLYETHYLENE AND LIGNIN CONTAINING COMPOSITION

Robert C. Danison, Painesville, Ohio, assignor to Diamond Alkali Company, Cleveland, Ohio, a corporation of Delaware No Drawing. Application August 17, 1949,
Serial No. 110,879

4 Claims. (Cl. 260—17.4)

This invention relates to plastic materials, and more particularly relates to flame-retardant plastic materials, and specifically to flame-retardant plastic materials which, when exposed to high temperatures, neither flame nor deposit particles of hot materials on surrounding surfaces.

It has heretofore been proposed to render flame-retardant various thermoplastic materials, among which is included polyethylene, being a polymer produced from ethylene by various means not forming a part of this invention. Various of these proposals have enjoyed more or less success and have included, among others, the provision in combination with the thermoplastic material of a highly chlorinated organic material, such as a chlorinated paraffin having between 50% and 80% of chemically combined chlorine and ideally about 70% of chemically combined chlorine, an inorganic flame-retardant substance, such as antimony oxide, and other additives, such as stabilizers for the chlorinated materials and the like. Plastic materials, particularly polyethylene, when treated with approximately 25% of a mixture comprising approximately 50% each of such chlorinated organic material and inorganic flame-retardant substance, satisfactorily pass standard flame-retardant tests and are becoming increasingly useful in commerce and industry, especially in view of some legislative insistence on flame-retardancy being imparted to plastic materials prior to their use in various applications, such as electric insulation, children's toys, public building devices, and the like.

A disadvantage has obtained particularly in the case of polyethylene when flameproofed by the above-outlined method in that though the polyethylene so treated does not flame and thus is substantially less of a fire hazard than untreated polyethylene, the polyethylene in a test flame, and thus in a flame which might be expected to be encountered under actual working conditions, even with the flame-retardant materials applied thereto, melts and drips hot plastic on surrounding areas, which hot plastic is sufficiently warm so that a real danger of fire on the part of materials contacted by the hot plastic exists, even though the plastic material itself will not burn.

It is an object of the present invention to provide a polyethylene suitably rendered flame-retardant and which has incorporated therein materials which, while not seriously adversely affecting the physical properties of the material and not affecting its flame-retardant character, prevent the drip of the hot plastic, whereby the advantageous properties of the materials are considerably enhanced.

A further object of the invention is to provide a mixture comprising polyethylene, flame-retardant agents, and a drip inhibitor for the purposes set forth above.

A further object of the invention is to provide polyethylene suitably combined with flame-retardant substances and including a portion of lignin-containing material, which lignin-containing material has the property of preventing drip and forming, upon exposure to high temperature, a solid char which does not drip but stays adherred to the original shape which is exposed to flame.

The present invention, in general, contemplates the combination of polyethylene, an organic flame-retardant substant, an inorganic flame-retardant substance, and a lignin-containing material, which combination has the combined properties of flame-retardancy and drip-resistance.

The flame and drip-proof composition of this invention includes, in addition to the polyethylene itself, a highly chlorinated organic material, preferably a highly chlorinated paraffin material containing from about 50% to 80% of chemically combined chlorine, and suitably approximately 70% of chemically combined chlorine. The inorganic flame-retardant substance may be chosen from the group of bismuth oxide, arsenic oxide, antimony oxide, bismuth sulfide, arsenic sulfide, and antimony sulfide.

The drip inhibitor is preferably chosen from any one of a variety of naturally or artificially occurring materials, wherein a substantial content of lignin or ligneous derivative is present. Suitable materials may be derived by various known means from lignocellulose. Thus, combinations of extracts of wood bark containing of the order of 50% to 70% of lignin derivatives are highly suitable in this connection. Hydrolyzed wood, from which some of the cellulose has been removed, whereby a content of lignin of the order of 30% to 50% is present in the combination, may be used and in addition, wood flour may be employed, which wood flour has an additional advantage of acting as a filler in the ultimate composition. It will be appreciated that these materials must be employed in a governed amount in order that a too high concentration of inflammable material not be included in the combination and thus defeat the purpose of the flame-retardant materials.

In addition to these main ingredients, it has been found preferable to employ a stabilizer for the chlorinated organic component of the composition, which stabilizer must be chosen to have stabilizing influence at ordinary temperatures and not to have stabilizing influence at flame temperatures in order that the chlorinated organic component may break down in flame temperatures and thus aid in imparting flame-retardant properties to the material. Thus, the stabilizer may be chosen from stabilizing materials having stabilizing ability within the range of temperatures of treatment of the material in the course of processing, such as 300° to 450° F., and must additionally fail to stabilize the chlorinated material at temperatures substantially thereabove. Examples of such materials are phenoxy propylene oxide, tribasic lead maleate, dibutyl diphenyl tin, and the like.

The addition of plasticizers, modifiers, fillers and the like to the composition of the present invention may, of course, be desired for various specific applications of the composition. However, amounts of these materials only insufficient to avoid defeating the flame-retardant and non-drip character of the ultimate composition are preferably used.

In addition to the advantage of preventing drip upon exposure of the treated polyethylene to flame temperatures, the present invention, comprising the combination of lignin-containing materials with flame-retardant polyethylene, has the additional advantage of not adversely affecting the tensile strength of the treated material as well as improving the hardness. Other physical properties have been examined and found to be not seriously deleteriously affected by the treatment. Accordingly, and in accordance with the present invention, a previously disadvantageous property of flame-retardant polyethylene has been removed by the treatment of this invention while certain other properties have been somewhat improved and no properties have been seriously affected during the treatment.

The composition of the present invention may suitably be mixed in any convenient fashion but for easy workability and in order to obtain the most efficient mix, it has been found preferable to combine the highly chlorinated material, the inorganic flame-retardant material, the lignin-containing material, and other additives, such as stabilizers, lubricants, and the like, in a dry mixer or the like, such as an intensive type mill, until thorough combination is obtained, and then combine the plastic material and the flame-retardant drip-proof mix on a rubber mill or the like in suitable proportions to obtain the ultimate product. In making the first combination, as there is no preferred order of addition of ingredients, the materials may be added in any suitable fashion. In making the combination on the rubber mill, however, it has been found in general preferable to sheet the plastic on the mill prior to addition of the flame-retardant and drip inhibitor combination thereto.

With respect to the percentage of ingredients, it has been found in general that the drip and flame-retardant combination may suitably comprise substantially one part each of organic flame-retardant material, inorganic flame-retardant material, and lignin-containing material, though any one of the ingredients of this combination may rise as high as 50% or drop as low as 10%. The stabilizer, of course, is employed in relatively small amounts based on the chlorinated material present and on the efficiency of the stabilizer, amounts from 1% to 10% of the chlorinated material being useful. The conventional lubricants for milling and for ultimate molding may be present in amounts up to 5% of the ultimate combined material.

The combination with the plastic may be made on a basis of between 20% and 50% of the above-disclosed mixture, the remainder being polyethylene. A particularly advantageous range for optimum plastic properties, flame-retardancy, and drip-proofness lies in the range of 25% to 35% of the mix, the remainder being polyethylene.

If desired, a combination of the aforesaid lignin-containing material and polyethylene with other flame-retardant ingredients, such as phosphorus-containing materials and the like, may be employed, as long as such other flame-retardant substances are compatible with the polyethylene. Moreover, if desired to avoid dripping of flaming plastic, even in the absence of flame-retardant properties, the lignin-containing material may be employed alone with the polyethylene, with the advantageous result that though the material burns readily, a solid, non-dripping char is formed rather than flaming material running off the burning piece. In such case, an amount of lignin-containing material equal to 5% to 20% of the total mix may be employed, more being used of the relatively lower lignin content materials.

In order that those skilled in the art may more fully understand the present invention, the method thereof, and the principles of this application, the following examples are set forth:

*Example I*

The following materials are mixed in a milling machine for a period of 15 minutes until a completely homogeneous mixture is obtained: Hydrolyzed wood comprising about 38% of lignin—31.4%, chlorinated paraffin containing 70% of chemically combined chlorine—31.4%, antimony oxide—31.4%, stabilizer—1.6%, and calcium stearate—4.2%. 67 parts of polyethylene are then sheeted on a rubber mill with the rolls at 215° F. 33 parts of the mix described above are added to the rolls when the sheeting is thoroughly accomplished and the entire mass cut and turned until a completely homogeneous mixture is obtained. Considerable ease of handling on the rubber mill is noted over milling in the absence of ligneous material. The ultimate sheet obtained from the roll is found to be self-extinguishing on the application of a flame thereto in accordance with the standard tests set forth below, and is further found to be substantially resistant to drip and to form a char when exposed to a flame in the manner of the test set forth below.

*Example II*

Following the procedure of Example I, a combination of 42% of highly chlorinated parafin having 70% of chemically combined chlorine—42.5% of antimony oxide—12.7% of finely ground flour derived from red-wood bark and having a lignin content of approximately 68%, and 2.3% of stabilizer is intimately mixed. 45% of this combination is combined with 55% of polymerized ethylene on a rubber mill in the manner of Example I. On testing of the material, after removal from the rolls of the rubber mill, it is found that the material is highly flame-retardant and highly drip-resistant when exposed to flame.

Testing of the flame-retardancy of the materials of the present invention is accomplished in accordance with the following procedure:

A strip of material one-inch wide and .075 inch thick and 6 inches long is suspended at an angle of 45° from the vertical. A 2-inch high, blue, gas flame is applied to the lower end of the strip for three periods of 15 seconds each, the second and third applications starting immediately upon the disappearance of any flame from the previous exposure. Note is made of the speed of the self-extinguishing subsequent to the removal of the flame.

Drip-resistance is tested as follows: Note is made whether liquid material falls during each of the exposure periods referred to in connection with the flame-retardant test above. Where no drips fall at all, the test is considered excellent.

The material of Example I self-extinguished within a period of 3 seconds subsequent to removal of the flame which is considered excellent and did not drip at all during the application of the flame or afterwards. The material of Example II self-extinguished within a period of 5 seconds subsequent to removal of the flame and did not drip at all during the application of the flame or subsequent thereto.

While there have been described various embodiments of the invention, the methods and products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method of obtaining a flame-retardant and drip-resistant polyethylene composition, which includes the steps of combining a highly chlorinated organic material containing 50% to 80% of chlorine, an inorganic flame-retardant substance chosen from the group of bismuth oxide, arsenic oxide, antimony oxide, bismuth sulfide, arsenic sulfide, and antimony sulfide, and a lignin-containing material, to form a mixture in which each of said three ingredients is present in an amount between 10% and 50% of the mixture, and combining said mixture with polyethylene in proportion to yield a combination in which 20% to 50% consists of said mixture.

2. The method of preparing a flame-retardant and drip-resistant polyethylene composition, which includes the steps of combining one part each of highly chlorinated paraffin having about 70% of chemically combined chlorine, antimony oxide, and a lignin-containing material having at least 30% of lignin therein, and upon completing this combination, combining one part of the mixture with three parts of polyethylene.

3. A composition of matter including between about 20% and 50% of a mixture of a highly chlorinated organic material having from 50% to 80% of chemically combined chlorine, an inorganic flame-retardant material chosen from the group of bismuth oxide, arsenic oxide, antimony oxide, bismuth sulfide, arsenic sulfide, and antimony sulfide, and a lignin-containing material, each of said ingredients being present in an amount of between 10% and 50% of the mixture, the remainder of the composition consisting essentially of polyethylene, the composition being characterized by flame-retardancy and drip-resistance when exposed to flame temperatures.

4. A composition comprising between about 20% and 50% of a combination of one part each of chlorinated paraffin having about 70% of chemically combined chlorine, antimony oxide, and a lignin-containing material having more than about 30% of lignin, the remainder of the composition consisting essentially of polyethylene, said composition being characterized by flame-retardancy and drip-resistance when exposed to flame temperatures.

ROBERT C. DANISON.

REFERENCES CITED

The following references are of record in the file of this patent:

UNITED STATES PATENTS

| Number | Name | Date |
|---|---|---|
| 2,386,674 | Flint | Oct. 9, 1945 |
| 2,461,900 | Johnson | Feb. 15, 1949 |
| 2,480,298 | Happoldt | Aug. 30, 1949 |